US010654655B2

(12) United States Patent
Newberg et al.

(10) Patent No.: US 10,654,655 B2
(45) Date of Patent: May 19, 2020

(54) STUCK SLIDE DETERMINATION SYSTEM

(71) Applicant: Leica Biosystems Imaging, Inc., Vista, CA (US)

(72) Inventors: Nicholas Newberg, San Marcos, CA (US); Prentash Djelosevic, Oceanside, CA (US); Aaron Stearrett, Port Orchard, WA (US); Peyman Najmabadi, San Diego, CA (US)

( * ) Notice: Subject to any disclaimer, the term of this patent is extended or adjusted under 35 U.S.C. 154(b) by 0 days.

(21) Appl. No.: 16/152,234

(22) Filed: Oct. 4, 2018

(65) Prior Publication Data

US 2019/0100383 A1     Apr. 4, 2019

Related U.S. Application Data

(60) Provisional application No. 62/568,202, filed on Oct. 4, 2017.

(51) Int. Cl.
*B65G 43/00* (2006.01)
*G01V 8/12* (2006.01)
(Continued)

(52) U.S. Cl.
CPC ......... *B65G 43/00* (2013.01); *G01N 21/6458* (2013.01); *G01N 35/00029* (2013.01);
(Continued)

(58) Field of Classification Search
CPC .. B65G 43/00; B65G 2203/044; G01N 21/84; G01N 35/00029; G01N 2035/00039; G01N 2035/00138; G01V 8/12; G02N 21/00

See application file for complete search history.

(56) References Cited

U.S. PATENT DOCUMENTS 5,671,288 A  9/1997 Wilhelm et al.
7,140,738 B2 11/2006 Guiney et al.
(Continued)

FOREIGN PATENT DOCUMENTS

WO  2003034075 A1  4/2003

OTHER PUBLICATIONS

Pantanowitz et al., "Tracking in Anatomic Pathology", (2013), retrieved from http://www.archivesofpathology.org/doi/pdf/10.5858/arpa.2013-0125-SA, in 13 pages.
(Continued)

*Primary Examiner* — Dominic J Bologna
(74) *Attorney, Agent, or Firm* — Procopio; Pattric J. Rawlins; Jonathan D. Cheng

(57) ABSTRACT

A stuck slide determination system is provided that determines if a slide (e.g., glass slide), positioned on a scanning stage at the start of the scanning process, gets stuck and does not move along with the scanning stage after the scanning process commences. In an embodiment, the system includes a sensor having a transmitter and receiver that are relatively positioned to detect the presence of the stage or a slide or the absence of the stage or a slide. When the scanning stage begins to move at the start of the scanning process, a processor monitors a signal from the sensor and determines if the slide is improperly positioned after the scanning process has commenced. If the slide is improperly positioned, the processor stops movement of the scanning stage in order to protect the slide from damage.

20 Claims, 7 Drawing Sheets

(51) Int. Cl.
*G01N 35/00* (2006.01)
*G02B 21/00* (2006.01)
*G01N 21/64* (2006.01)

(52) U.S. Cl.
CPC .............. *G01V 8/12* (2013.01); *G02B 21/00* (2013.01); *B65G 2203/044* (2013.01); *G01N 2035/00039* (2013.01); *G01N 2035/00138* (2013.01)

(56) References Cited

U.S. PATENT DOCUMENTS

| | | |
|---|---|---|
| 7,300,163 B2 | 11/2007 | Scampini |
| 7,859,667 B2 | 12/2010 | Scampini |
| 8,508,846 B2 | 8/2013 | Fischer et al. |
| 8,593,730 B2 | 11/2013 | Yamamoto et al. |
| 9,201,234 B2 | 12/2015 | Gelbart |
| 9,243,934 B2 | 1/2016 | Loerch |
| 2011/0006219 A1* | 1/2011 | Schausberger ..... G01N 21/6458 250/459.1 |
| 2011/0249327 A1* | 10/2011 | Yamamoto ............. G02B 21/26 359/391 |
| 2012/0076391 A1 | 3/2012 | Dietz et al. |
| 2016/0252713 A1 | 9/2016 | Corwin |
| 2017/0126911 A1 | 5/2017 | Kogi |

OTHER PUBLICATIONS

International Search Report and Written Opinion dated Dec. 26, 2018 for related International Application No. PCT/US2018/054464, in 17 pages.

\* cited by examiner

FIG. 4A
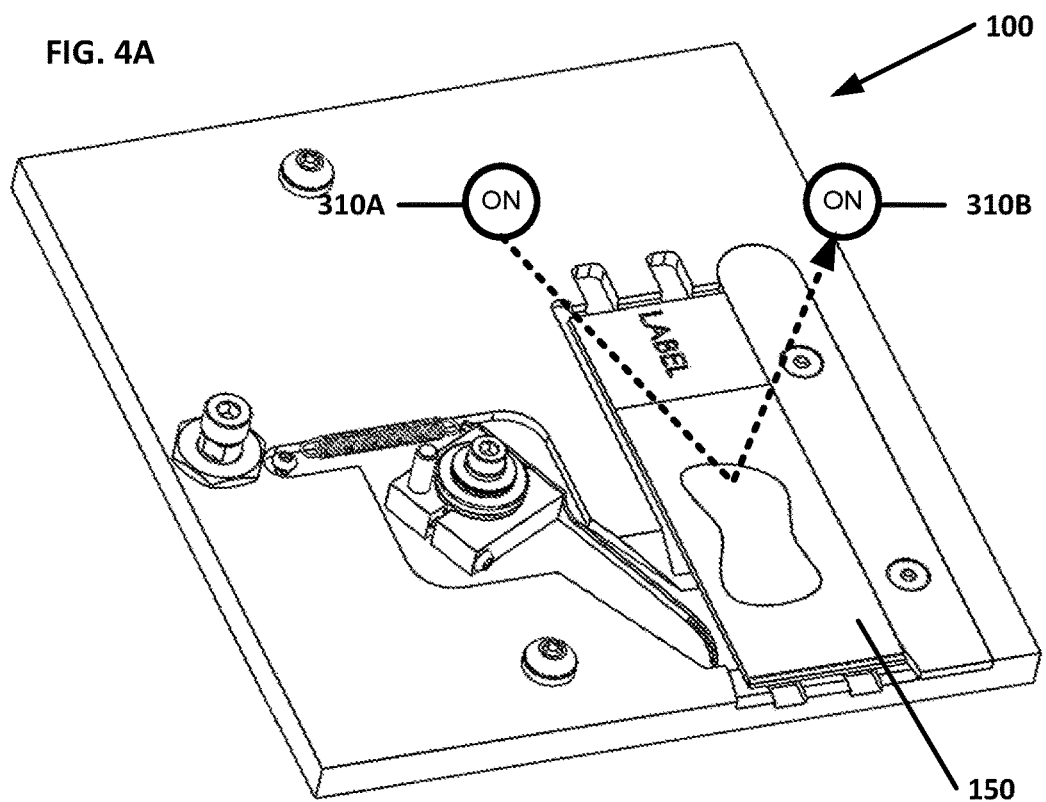
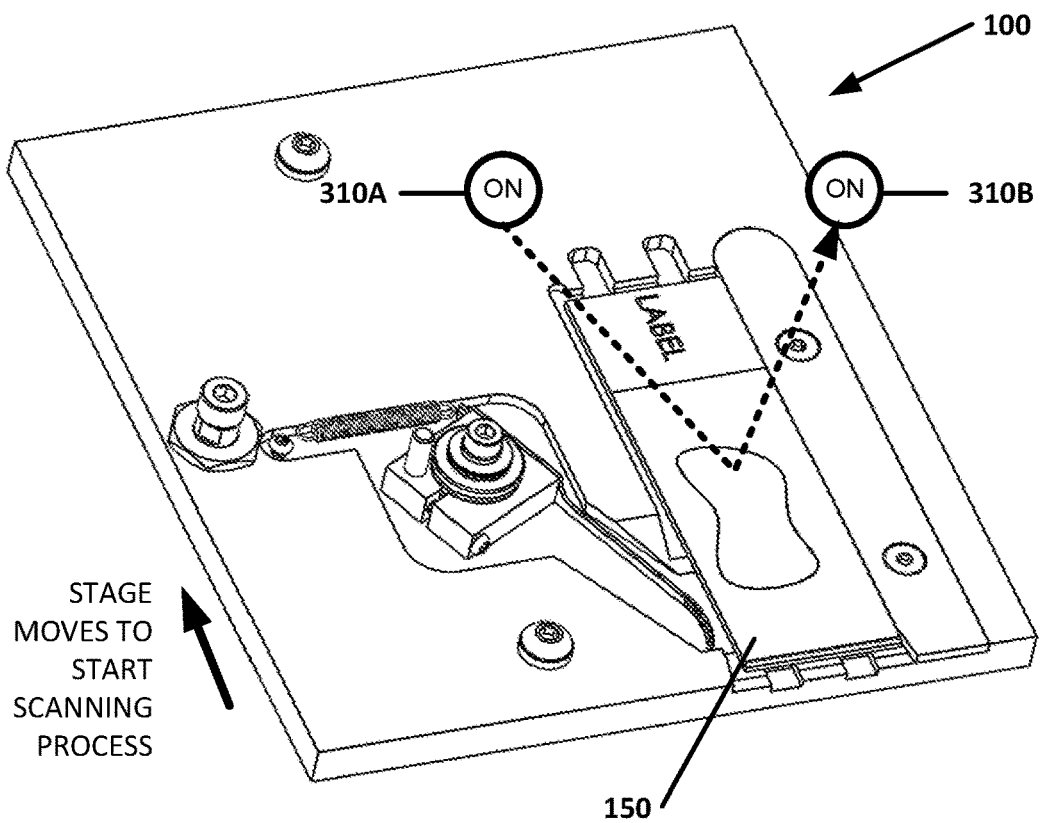
FIG. 4B

STUCK SLIDE DETERMINATION SYSTEM

CROSS-REFERENCE TO RELATED APPLICATIONS

The present application claims priority to U.S. Provisional Patent App. No. 62/568,202, filed on Oct. 4, 2017, which is hereby incorporated herein by reference as if set forth in full.

BACKGROUND

Field of the Invention

The present invention generally relates to a digital slide scanning apparatus, and more particularly, to processing of individual slides (e.g., glass slides) from slide racks to a scanning stage by a digital slide scanning apparatus (e.g., for digital pathology).

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine in order to achieve even better, faster, and cheaper diagnosis, prognosis, and prediction of important diseases, such as cancer.

Glass slides that are processed by a digital slide scanning apparatus are very fragile and highly valuable. In some instances, slides on a scanning stage may be improperly positioned. This can cause conventional digital slide scanners to damage the glass slides, for example, by moving the stage out from underneath a glass slide when the glass slide is stuck. Therefore, what is needed is a system and method that overcomes these significant problems found in the conventional systems described above.

SUMMARY

Accordingly, a stuck-slide determination system is described herein for use with a digital slide scanning apparatus. In an embodiment, the system is configured to determine if a slide (e.g., glass slide), positioned on a stage for scanning, gets stuck such that it does not move along with the scanning stage at the start of the scanning process. The system may include a sensor having a transmitter and receiver that are positioned, with respect to each other, to detect the presence of the stage or a slide or the absence of the stage or a slide. When the scanning stage begins to move at the start of the scanning process, a processor monitors a signal from the sensor to determine if the slide is improperly positioned after the scanning process has commenced. If the slide is improperly positioned, the processor stops movement of the scanning stage in order to protect the slide from damage.

In an embodiment, a digital slide scanning apparatus is disclosed that comprises: a scanning stage configured to receive a glass slide and secure the glass slide to the scanning stage; a motor configured to move the scanning stage and the glass slide during a scanning process; a sensor pair comprising a transmitter element and a receiver element, wherein the relative positions of the transmitter and receiver elements are configured to detect the presence of the scanning stage or the glass slide prior to commencing the scanning process; and a processor configured to control the motor to move the scanning stage during the scanning process, the processor further configured to receive a signal from the sensor pair subsequent to beginning the scanning process, the processor further configured to analyze the signal to determine a presence or absence of the glass slide, the processor further configured to control the motor to stop movement of the scanning stage in response to determining an improper position of the glass slide based on the presence or absence of the glass slide. The processor may be configured to determine an improper position of the glass slide based on the presence of the glass slide subsequent to beginning the scanning process, and/or determine an improper position of the glass slide based on the absence of the glass slide subsequent to beginning the scanning process. Each of the transmitter and receiver elements of the sensor pair may be positioned on a same side of the glass slide. The processor may be configured to determine an improper position of the glass slide based on the presence of the glass slide subsequent to beginning the scanning process. One of the transmitter and receiver elements of the sensor pair may be positioned on a first side of the glass slide while the other one of the transmitter and receiver elements of the sensor pair is positioned on a second side of the glass slide. The processor may be configured to determine an improper position of the glass slide based on the absence of the glass slide subsequent to beginning the scanning process. The sensor pair may be positioned to detect a presence or absence of a rear portion of the glass slide as determined by a direction of movement of the scanning stage. The sensor pair may be positioned to detect a presence or absence of a front portion of the glass slide as determined by a direction of movement of the scanning stage.

In an embodiment, a method is disclosed that comprises: using a processor to activate a sensor pair comprising a transmitter element and a receiver element, wherein the relative positions of the transmitter and receiver elements are configured to detect the presence of a scanning stage or a glass slide; subsequent to activating the sensor pair, using the processor to control a motor to move a scanning stage supporting a glass slide to begin a scanning process; using the processor to receive a signal from the sensor pair subsequent to beginning the scanning process; using the processor to analyze the received signal to determine a presence or absence of the glass slide; and using the processor to control the motor to stop movement of the scanning stage in response to determining an improper position of the glass slide based on the presence or absence of the glass slide. The method may further comprise using the processor to determine an improper position of the glass slide based on the presence of the glass slide subsequent to beginning the scanning process and/or using the processor to determine an improper position of the glass slide based on the absence of the glass slide subsequent to beginning the scanning process.

In an embodiment, a digital slide scanning apparatus is disclosed that comprises: a scanning stage configured to receive a first glass slide and secure the first glass slide to the scanning stage; a motor configured to move the scanning stage and the first glass slide during a scanning process; a sensor pair comprising a transmitter element and a receiver element, wherein the relative positions of the transmitter and receiver elements are configured to detect the presence of the scanning stage or the first glass slide prior to commencing the scanning process; and a processor configured to receive a signal from the sensor pair prior to loading a second glass slide onto the scanning stage, the processor further configured to analyze the signal to determine a presence or absence of the first glass slide on the scanning stage, the processor further configured to unload the first glass slide from the scanning stage in response to determining a presence of the first glass slide on the scanning stage. Each of the transmitter and receiver elements of the sensor pair may be positioned on a same side of the first glass slide. One of the transmitter and receiver elements of the sensor pair may be positioned on a first side of the first glass slide while the other one of the transmitter and receiver elements of the sensor pair is positioned on a second side of the first glass slide. The sensor pair may be positioned to detect a presence or absence of a rear portion of the first glass slide as determined by a direction of movement of the scanning stage. The sensor pair may be positioned to detect a presence or absence of a front portion of the first glass slide as determined by a direction of movement of the scanning stage.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 4A is a perspective view diagram illustrating an example scanning stage with glass slide positioned to start the scanning process and a sensor pair trained on the scanning stage, according to an embodiment;

FIG. 4B is a perspective view diagram illustrating the example scanning stage in FIG. 4A after beginning the scanning process when a slide is properly positioned (i.e., not stuck), according to an embodiment;

DETAILED DESCRIPTION

Embodiments disclosed herein provide for a system to determine when a slide, positioned on a stage for scanning, has gotten stuck such that it does not move with the scanning stage. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
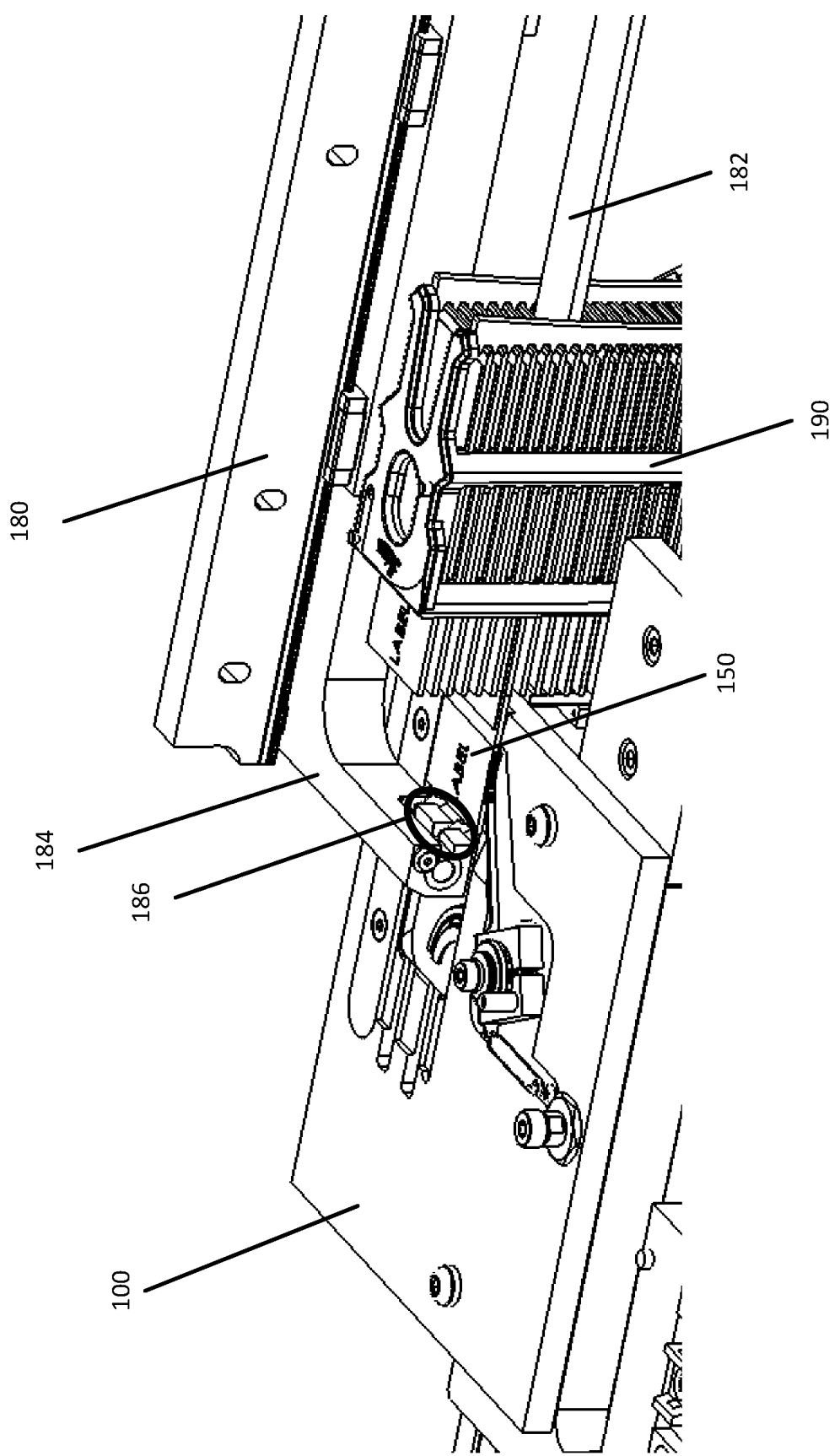
FIG. 1 is a perspective view diagram illustrating an example digital scanning apparatus loading a glass slide from a slide rack onto a scanning stage, according to an embodiment.

FIG. 1 is a perspective view diagram illustrating an example digital scanning apparatus loading a glass slide from a slide rack onto a scanning stage, according to an embodiment. In the illustrated embodiment, the digital scanning apparatus includes a push/pull assembly 180 comprising a push bar 182, configured to be inserted into a slot of a slide rack 190 to push a slide 150 out of the slot when loading the stage 100, and a pull bar 184 with pull fingers 186, configured to pull the slide 150 out of the slide rack 190 when loading the stage 100 and/or push the slide 150 into the slide rack 190 when unloading the stage 100. A processor of the digital scanning apparatus is configured to control the push/pull assembly 180 to load the slide 150 from a slide rack 190 onto the scanning stage 100 and unload the slide 150 from the scanning stage 100 into the slide rack 190.

Once the glass slide 150 is loaded onto the scanning stage 100, the processor of the digital slide scanning apparatus controls the push/pull assembly 180 to be repositioned out of the way before scanning commences. After the slide 150 is positioned on the stage 100, the slide 150 is secured to the stage 100 so that the slide 150 remains stationary on the stage 100 during the scanning process.

Figure 2:
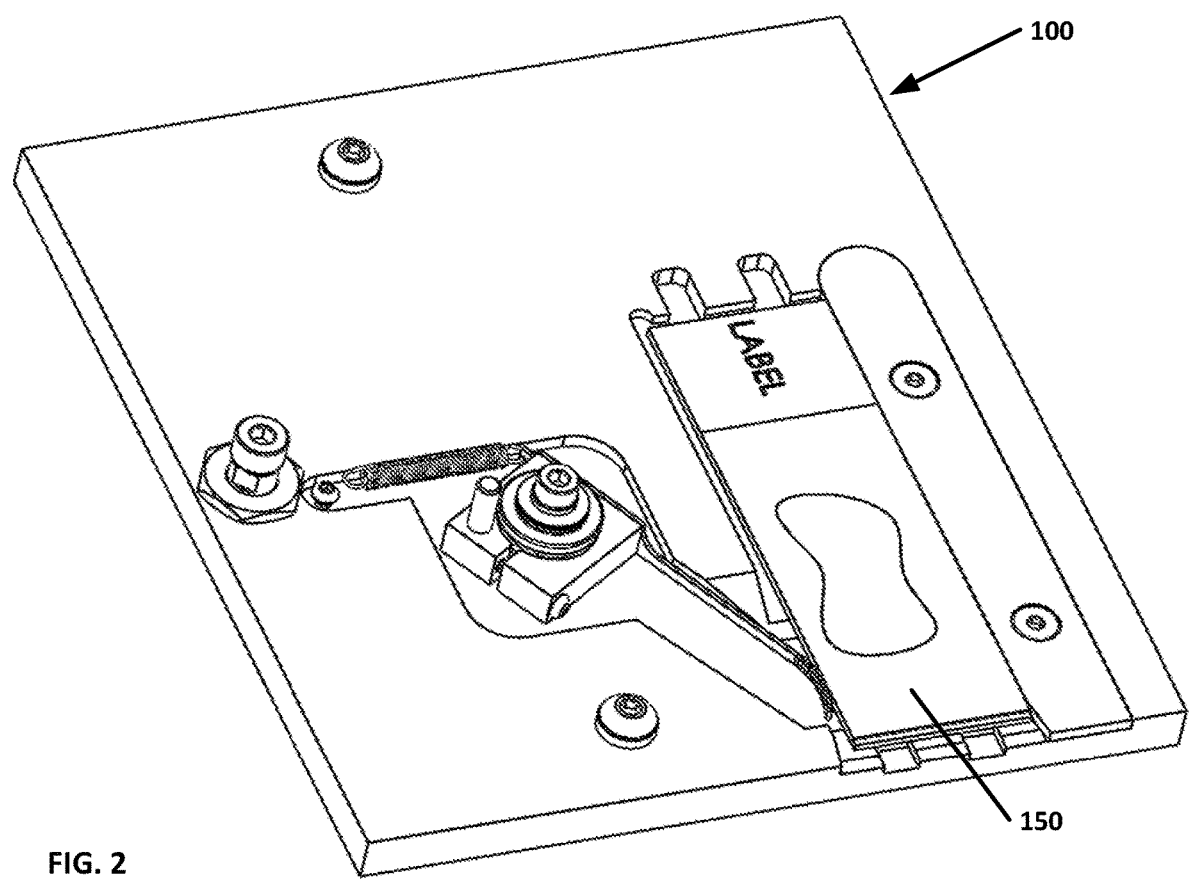
FIG. 2 is a perspective view diagram illustrating an example scanning stage with a glass slide positioned to start the scanning process, according to an embodiment.

FIG. 2 is a perspective view diagram illustrating an example scanning stage with a glass slide positioned to start the scanning process, according to an embodiment. In the illustrated embodiment, the loaded slide 150 is secured to the stage 100 so that the slide remains stationary on the stage 100 during the scanning process. However, in some instances, the slide 150 can get stuck, such that the slide 150 does not remain secured to the stage 100 during scanning.

Figure 3A:
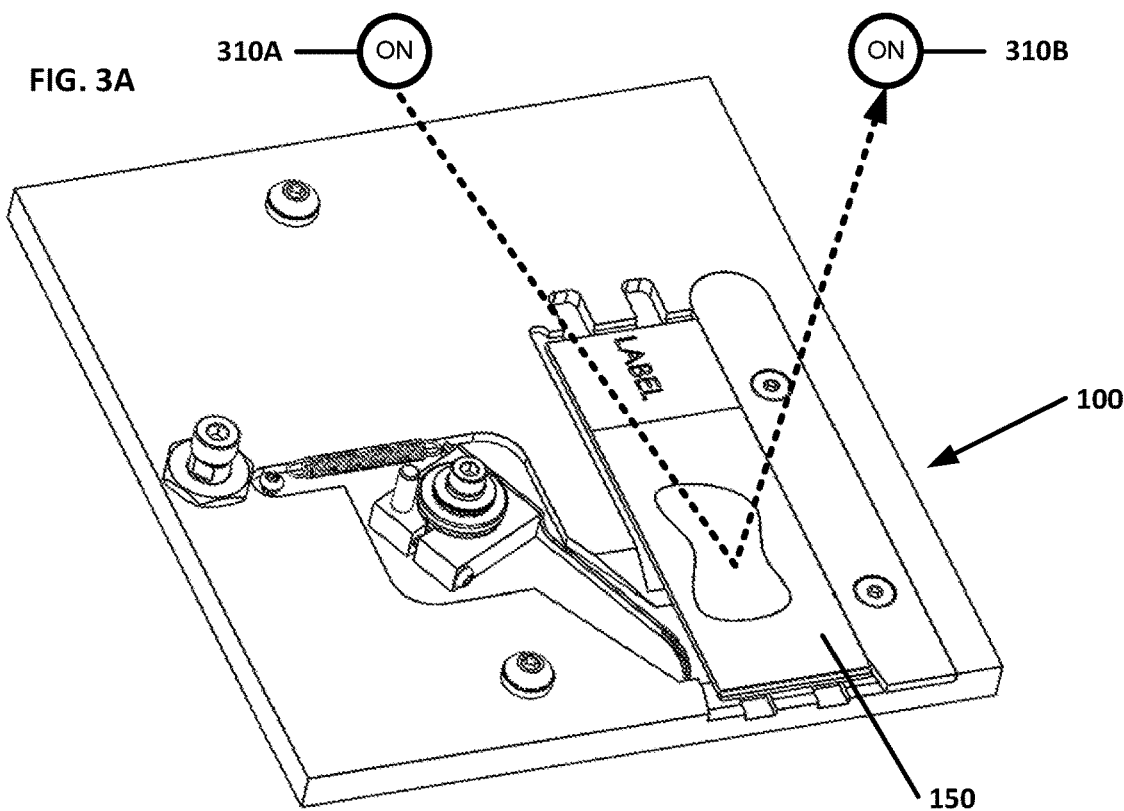
FIG. 3A is a perspective view diagram illustrating an example scanning stage with a glass slide positioned to start the scanning process and a sensor pair trained on the slide, according to an embodiment.

FIG. 3A is a perspective view diagram illustrating an example scanning stage with a glass slide positioned to start the scanning process, and a sensor pair trained on the slide, according to an embodiment. In the illustrated embodiment, the sensor pair 310 includes a transmit element 310A and a receive element 310B. The elements of the sensor pair 310 are positioned, relative to each other and the stage 100, such that the sensor pair 310 is configured to detect the presence of a slide 150 on the stage 100, before the scanning process commences. This positioning allows a processor of the digital slide scanning apparatus to confirm the presence of the slide 150 on the stage 100, prior to any movement of the stage 100 related to the scanning process. For example, the processor of the digital slide scanning apparatus may be configured to, if no slide 150 is present on the scanning stage 100 after the digital scanning apparatus attempts to load a slide 150 onto the scanning stage 100, prevent commencement of the scanning process.

In the illustrated embodiment, both the transmit element 310A and the receive element 310B are above the stage 100 and are positioned to detect the presence or absence of the slide 150 by reflection of a signal sent by the transmit element 310A and either received or not received by the receive element 310B. Specifically, in the illustrated embodiment, the transmit element 310A transmits a signal to a fixed position at which a portion of the slide 150 should be at the start of the scanning process, but at which no portion of the slide 150 should be during at least a portion of the scanning process. As shown in FIG. 3A, since a slide 150 is loaded onto the stage 100, at the start of the scanning process, the signal from the transmit element 310A reflects off of the slide 150 and is received by the receive element 310B. Thus, the sensor pair 310 detects the presence of the slide 150, and provides this information to the processor of the digital slide scanning apparatus for analysis. Based on this information from the sensor pair 310, the processor will determine that the slide 150 is present, and therefore, in this instance, may commence the scanning process.

Notably, in an embodiment, if the slide 150 were not present, the signal from the transmit element 310A would pass through a through hole for illuminating the slide 150 from below (e.g., through hole 132 illustrated in FIG. 4C), and therefore, the signal would not be reflected and would not be received by the receive element 310B. Based on this information from the sensor pair 310, the processor may determine that the slide 150 is not present, and therefore, not commence the scanning process.

Figure 3B:
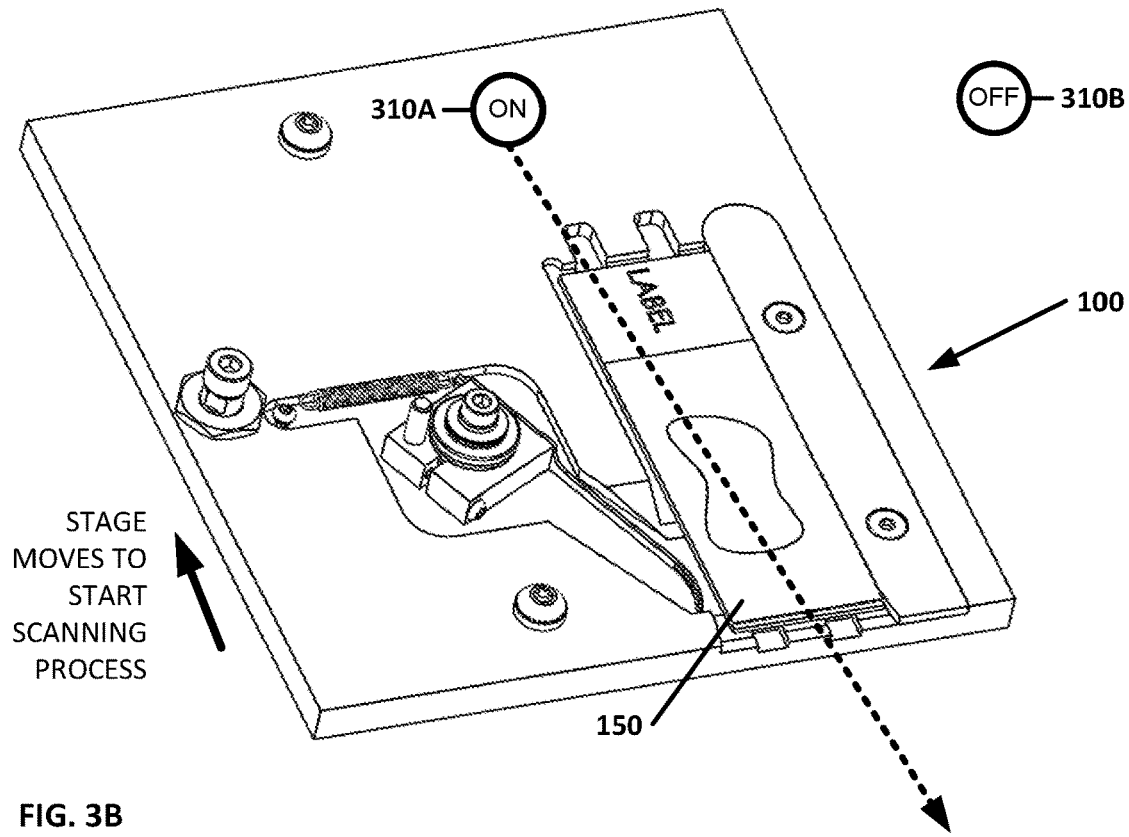
FIG. 3B is a perspective view diagram illustrating the example scanning stage in FIG. 3A after beginning the scanning process when a slide is properly positioned (i.e., not stuck), according to an embodiment.

FIG. 3B is a perspective view diagram illustrating the example scanning stage 100 in FIG. 3A after beginning the scanning process, when the slide 150 is properly positioned so as not to be stuck, according to an embodiment. In the illustrated embodiment, because the scanning process has commenced, the scanning stage 100 has moved. In this case, because the slide 150 is properly positioned and not stuck, the slide 150 has moved with the scanning stage 100. Since the slide 150 and the stage 100 have passed out of the signal path of the transmit element 310A, the signal will not be reflected by the slide 150 and will not be received by the receive element 310B. Thus, the sensor pair 310 no longer detects the presence of the slide 150. Based on this information (or lack thereof) from the sensor pair 310, the processor will determine that the slide 150 is not present, and therefore, in this instance, continue the scanning process as normal.

Figure 3C:
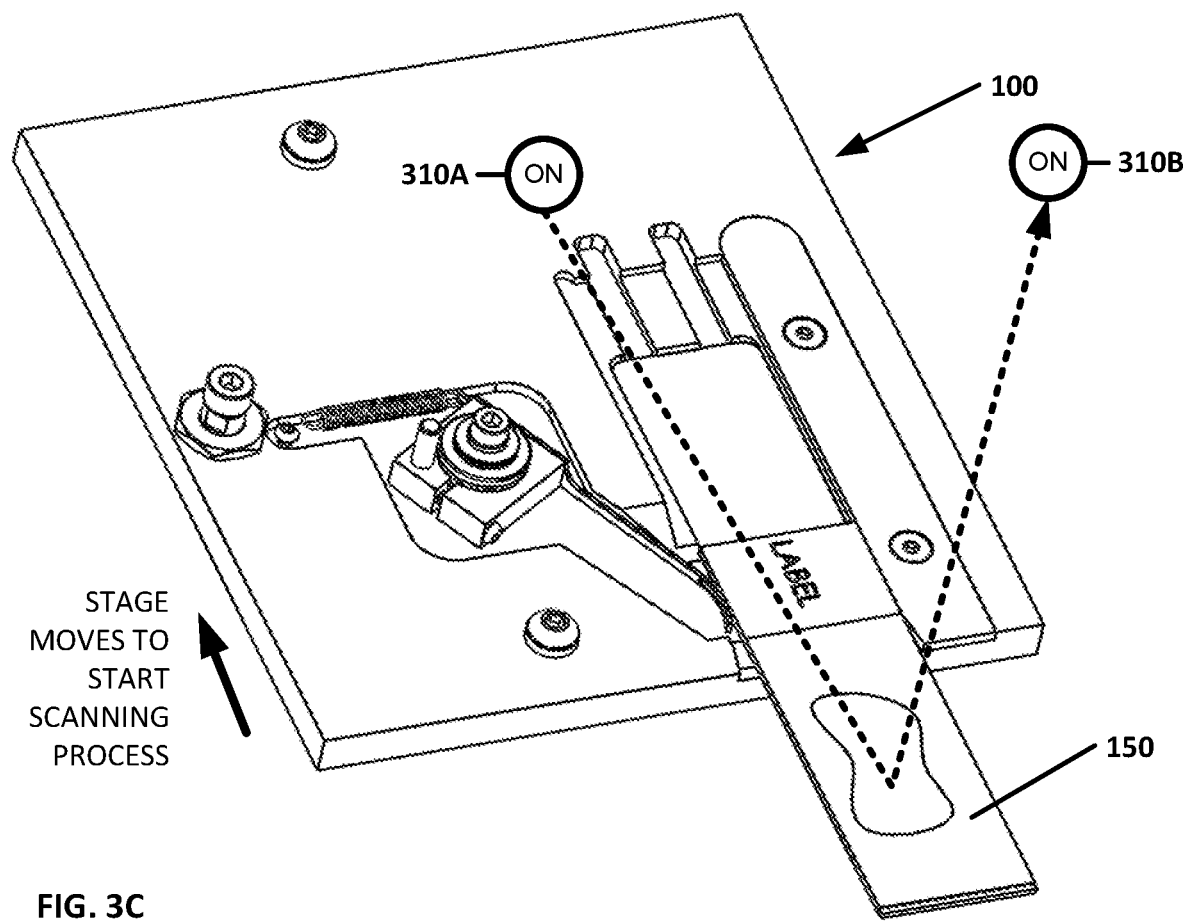
FIG. 3C is a perspective view diagram illustrating the example scanning stage in FIG. 3A after beginning the scanning process and a sensor pair trained on a stuck slide, according to an embodiment.

FIG. 3C is a perspective view diagram illustrating the example scanning stage 100 in FIG. 3A after beginning the scanning process, with the sensor pair 310 still trained on a stuck slide 150, according to an embodiment. In the illustrated embodiment, because the scanning process has commenced, the scanning stage 100 has moved. Accordingly, the slide 150 should have moved with the scanning stage 100 and out from underneath the signal from the transmit element 310A. However, because the slide 150 is stuck, the sensor pair 310 still detects the presence of the slide 150. Specifically, the signal from the transmit element 310A continues to reflect off of the slide 150 and is received by the receive element 310B, which provides this information to the processor of the digital slide scanning apparatus for analysis. Based on this information from the sensor pair 310, indicating the continued presence of the slide 150 after the scanning process has commenced, the processor determines that the slide 150 is stuck. The processor is configured to, in response to determining that the slide 150 is stuck, stop movement of the stage 100 in order to protect the slide 150 from damage.

In an embodiment, the processor of the digital slide scanning apparatus is configured to receive and analyze the signal from the sensor pair 310 before a slide 150 is loaded onto the stage 100 to confirm that a slide 150 is not already present on the scanning stage 100. Specifically, as mentioned above, if no slide 150 is present on the stage 100 before the loading process, the signal from the transmit element 310A would pass through a through hole for illuminating the slide 150 from below (e.g., through hole 132 illustrated in FIG. 4C), and therefore, the signal would not be reflected and would not be received by the receive element 310B. Based on this information from the sensor pair 310, the processor can determine that a slide 150 is not already present on the stage 100, and therefore, commence loading a slide 150 from the slide rack 190 onto the stage 100. On the other hand, if a slide 150 is detected (i.e., the receiving element 310B receives the reflected signal from the transmit element 310A), the processor of the digital slide scanning apparatus may be configured to unload the slide 150 into the slide rack 190 before loading a new slide 150 from the slide rack 190.

FIG. 4A is a perspective view diagram illustrating an example scanning stage with a glass slide positioned to start the scanning process, and a sensor pair trained on the scanning stage, according to an embodiment. In the illustrated embodiment, the sensor pair 310 includes a transmit element 310A and a receive element 310B. The elements of the sensor pair 310 are positioned, relative to each other and the stage 100, such that the sensor pair 310 is configured to detect the presence of a slide 150 on the stage 100 and/or the presence of the stage 100 itself, before the scanning process commences. For example, in this embodiment, the sensor pair 310 may be positioned, when the stage 100 is positioned to start the scanning process, to reflect a signal of the transmit element 310A off of a surface of the stage 100 itself, instead of the slide 150 supported on the stage 100. However, it should be understood that positioning the sensor pair 310 to reflect a signal off of the slide 150 allows a processor of the digital slide scanning apparatus to confirm the presence of the slide 150 on the stage 100, prior to any movement of the stage 100 related to the scanning process. For example, the processor of the digital slide scanning apparatus may be configured to, if no slide 150 is present on the scanning stage 100, after the digital scanning apparatus attempts to load a slide 150 onto the scanning stage 100, prevent commencement of the scanning process.

In the illustrated embodiment, both the transmit element 310A and the receive element 310B are above the stage 100 and are positioned to detect the presence or absence of the slide 150 by reflection of a signal sent by the transmit element 310A and either received or not received by the receive element 310B. Specifically, in the illustrated embodiment, the transmit element 310A transmits a signal to a fixed position at which a portion of the slide 150 should be at the start of the scanning process and throughout the scanning process. For example, the sensor pair 310 may be fixed to the stage 100, such that the signal from the transmit element 310A is always trained at the same fixed position on the stage 100 and within the boundaries of where a slide 150 would be present when supported on the stage 100. Alternatively, the sensor pair 310 may be positioned relative to the stage 100, such that the signal from the transmit element 310A is always trained at a position within the boundaries of the stage 100 and, during at least a portion of the scanning process, will be trained at a position within the boundaries of where a slide 150 would be present when supported on the stage 100. As shown in FIG. 4A, since a slide 150 is loaded onto the stage 100, at the start of the scanning process, the signal from the transmit element 310A reflects off of the slide 150 and is received by the receive element 310B. Thus, the sensor pair 310 detects the presence of the slide 150, and provides this information to the processor of the digital slide scanning apparatus for analysis. Based on this information from the sensor pair 310, the processor will determine that the slide 150 is present, and therefore, in this instance, may commence the scanning process.

Notably, in an embodiment, if the slide 150 were not present, the signal from the transmit element 310A would pass through a through hole 132 for illuminating the slide 150 from below, and therefore, the signal would not be reflected and would not be received by the receive element 310B. Based on this information from the sensor pair 310, the processor may determine that the slide 150 is not present, and therefore, not commence the scanning process.

FIG. 4B is a perspective view diagram illustrating the example scanning stage 100 in FIG. 4A after beginning the scanning process, when the slide 150 is properly positioned so as not to be stuck, according to an embodiment. In the illustrated embodiment, because the scanning process has commenced, the scanning stage 100 has moved. In this case, because the slide 150 is properly positioned and not stuck, the slide 150 has moved with the scanning stage 100. Since the slide 150 and the stage 100 have both moved and the transmit element 310A trains a signal at a position within the boundaries of where a slide 150 should be positioned during movement of the stage 100, the signal is reflected off of the slide 150 and received by the receive element 310B. Thus, the sensor pair 310 continues to detect the presence of the slide 150, and provides this information to the processor of the digital slide scanning apparatus for analysis. Based on this information from the sensor pair 310, the processor will determine that the slide 150 is present at the position in which it should be during the scanning process, and therefore, in this instance, continue the scanning process as normal.

Figure 4C:
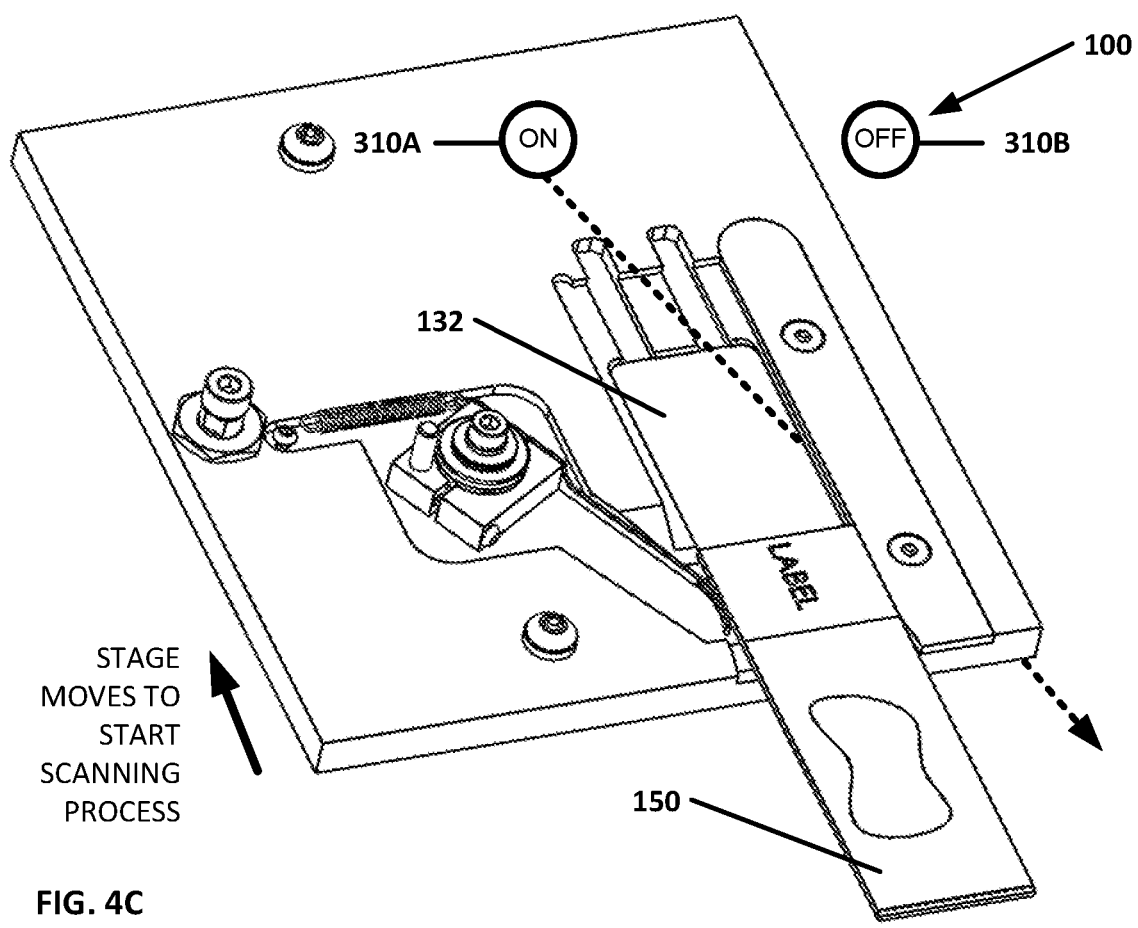
FIG. 4C is a perspective view diagram illustrating the example scanning stage in FIG. 4A after beginning the scanning process and a sensor pair trained on an opening in the scanning stage due to a stuck slide, according to an embodiment.

FIG. 4C is a perspective view diagram illustrating the example scanning stage 100 in FIG. 4A after beginning the scanning process, with the sensor pair 310 trained on a through hole 132 in the scanning stage, according to an embodiment. During normal operation, during the scanning process, the slide 150 will cover the through hole 132. Specifically, in an embodiment which scans glass slides, a glass slide 150 is positioned over the through hole 132, such that the glass slide 150 may be illuminated from below the stage 100 during the scanning process.

In the illustrated embodiment, because the scanning process has commenced, the slide 150 should have moved with the stage 100 to a position in view of the signal of the sensor pair 310, as illustrated in FIG. 4B. However, because the slide 150 is stuck, when the stage 100 moves to start the scanning process, the sensor pair 310 is no longer detecting the presence of the slide 150. Rather, since the slide 150 has not moved with the stage 100, the transmit signal transmitted by the transmit element 310A passes through the through hole 132, instead of reflecting off of the slide 150. Thus, the receive element 310B will not receive the reflected signal from the transmit element 310A. Based on this information (or lack thereof) from the sensor pair 310, indicating the absence of the slide 150 after the scanning process has commenced, the processor determines that the slide 150 is stuck. The processor is configured to, in response to determining that the slide 150 is stuck, stop movement of the stage 100 in order to protect the slide 150 from damage.

In an embodiment, the processor of the digital slide scanning apparatus is configured to check the signal from the sensor pair 310, to determine whether or not a slide 150 is stuck, within seconds or milliseconds after movement of the stage 100 commences with the beginning of the scanning process. Advantageously, if a stuck slide 150 is detected, the processor of the digital scanning apparatus may be configured to apply retry logic in an attempt to get the slide 150 unstuck. The retry logic may include repositioning the stage 100 at the "load slide" position. The retry logic may also include adjusting a position of the glass slide 150 using the push/pull assembly 180. For example, the processor may control the push/pull assembly 180 to at least partially unload the slide 150 from the scanning stage 100 (e.g., into a slot of the slide rack 190) and then reload the slide 150 onto the scanning stage 100 (e.g., from the slot of the slide rack 190). The processor may execute the retry logic a predetermined number of times (e.g., one time, three times, etc.). If the processor determines that the slide 150 remains stuck after the predetermined number of retry attempts, the processor may generate a warning (e.g., via an audible alert and/or a prompt on a display or user interface of the digital slide scanning apparatus).

While the transmit element 310A and the receive element 310B are primarily illustrated herein as being on the same side of the scanning stage 100 (i.e., above the stage 100 in the embodiments illustrated in FIGS. 3A-4C), in alternative embodiments of the systems illustrated in FIGS. 3A-4C, one of the transmit element 310A and receive element 310B may be positioned above the stage 100, and the other of the other one of the transmit element 310A and receive element 310B may be positioned below the stage 100. For example, the transmit element 310A may always be positioned on one side of the through hole 132 (e.g., above through hole 132), while the receive element 310B is always positioned in a line of sight of the signal from the transmit element 310A on the opposite side of the through hole (e.g., below through hole 132). In this case, the processor of the digital slide scanning apparatus may determine that a slide 150 is absent when the receive element 310B receives the signal from the transmit element 310A, and determine that a slide 150 is present when the receive element 310B does not receive the signal from the transmit element 310A. In an alternative embodiment, the transmit element 310A may be positioned on one side of the stage 100 (e.g., above the stage 100), while the receive element 310B is always positioned in a line of sight of the signal from the transmit element 310A on the opposite side of the stage 100 (e.g., below the stage 100), and the sensor pair 310 may be positioned such that, when a slide 150 is positioned on the stage 100 prior to commencement of the scanning process, a portion of the slide 150 is between the transmit element 310A and the receive element 310B so as to interrupt the signal, and when the scanning process commences, a properly positioned slide 150 should move with the stage 100 out from between the transmit element 310A and the receive element 310B so as to no longer interrupt the signal, whereas a stuck slide will not move with the stage 100 and remain between the transmit element 310A and the receive element 310B to interrupt the signal. In this case, the processor of the digital slide scanning apparatus may determine that a slide 150 is loaded when the receive element 310B does not receive the signal from the transmit element 310A prior to commencement of the scanning process, determine that a slide 150 is not stuck when the receive element 310B receives the signal from the transmit element 310A during the scanning process, and determine that the slide is stuck when the receive element 310B does not receive the signal from the transmit element 310A during the scanning process.

Alternative sensor arrangements may also be employed in order to confirm placement of a slide 150 on the scanning stage 100 prior to beginning the scanning process, and also to monitor for a stuck slide 150 after beginning the scanning process. Additional sensors may also be included. For example, a dedicated sensor may be employed to confirm placement of a slide 150 on the scanning stage 100 prior to beginning the scanning process.

Example Embodiment

In an embodiment, a digital slide scanning apparatus includes a scanning stage configured to receive a slide (e.g., glass slide) and secure the slide to the scanning stage, and a motor configured to move the scanning stage and the slide during a scanning process. In this embodiment, the digital slide scanning apparatus also includes a sensor pair comprising a transmitter element and a receiver element, wherein the relative positions of the transmitter and receiver elements are configured to detect the presence of the scanning stage and/or the slide prior to commencing the scanning process. Also in this embodiment, the digital slide scanning apparatus includes a processor configured to control the motor to move the scanning stage during the scanning process. The processor is also configured to receive a signal from the sensor pair, subsequent to beginning the scanning process, and analyze the signal to determine a presence or absence of the slide. The processor is also configured to control the motor to stop movement of the scanning stage in response to determining an improper position of the slide based on the presence or absence of the slide.

In an embodiment, the processor is configured to determine an improper position of the slide based on the presence of the slide subsequent to beginning the scanning process. In an alternative embodiment, the processor is configured to determine an improper position of the slide based on the absence of the slide subsequent to beginning the scanning process.

In an embodiment, each of the transmitter and receiver elements of the sensor pair are positioned on a same side of the slide, where a side is one of the top, bottom, or one of the four edges of the slide. In one aspect of this embodiment, the processor is configured to determine an improper position of the slide based on the presence of the slide subsequent to beginning the scanning process.

In an embodiment, one of the transmitter and receiver elements of the sensor pair is positioned on a first side of the slide and the other one of the transmitter and receiver elements of the sensor pair is positioned on a second side of the slide. For example, the first and second sides may be opposing sides such as top and bottom or left long edge and right long edge, such that the transmitter and receiver elements of the sensor pair are positioned in a line of sight orientation. In one aspect of this embodiment, the processor is configured to determine an improper position of the slide based on the absence of the slide subsequent to beginning the scanning process.

In an embodiment, the sensor pair is positioned to detect a presence or absence of a rear portion of the slide as determined by a direction of movement of the scanning stage. In an alternative embodiment, the sensor pair is positioned to detect a presence or absence of a front portion of the slide as determined by a direction of movement of the scanning stage.

In an embodiment, a method includes using a processor to activate a sensor pair comprising a transmitter element and a receiver element, wherein the combined positions of the transmitter and receiver elements are configured to detect the presence of a scanning stage or a slide. The method also includes, subsequent to activating the sensor pair, using the processor to control a motor to move a scanning stage supporting a slide to begin a scanning process and using the processor to receive a signal from the sensor pair subsequent to beginning the scanning process. The method also includes using the processor to analyze the received signal to determine a presence or absence of the slide and using the processor to control the motor to stop movement of the scanning stage in response to determining an improper position of the slide based on the presence or absence of the slide.

In an embodiment, the method further comprises using the processor to determine an improper position of the slide based on the presence of the slide subsequent to beginning the scanning process. In an alternative embodiment, the method comprises using the processor to determine an improper position of the slide based on the absence of the slide subsequent to beginning the scanning process.

Example Digital Slide Scanning Apparatus

Figure 5A:
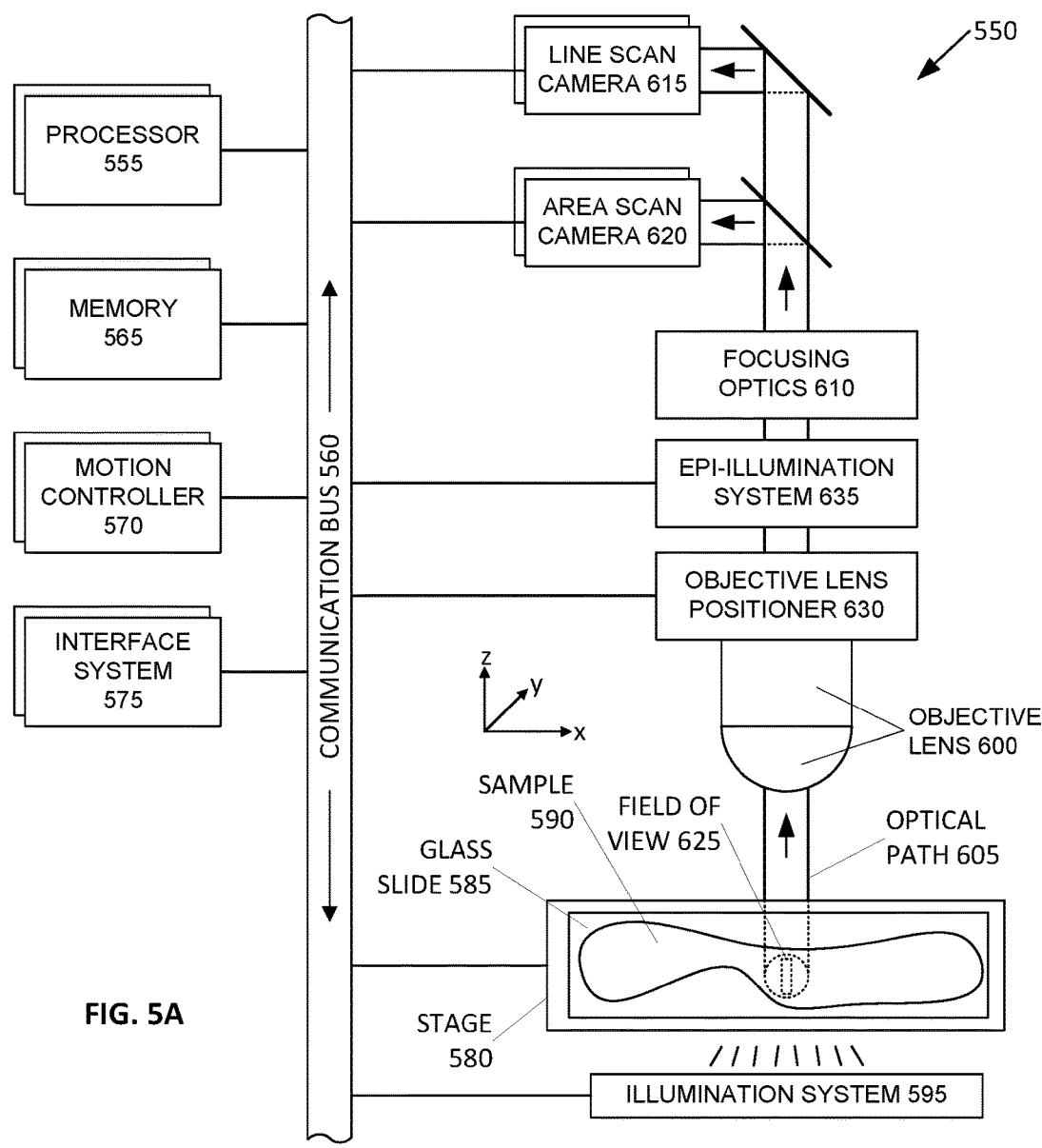
FIG. 5A is a block diagram illustrating an example processor-enabled device that may be used in connection with various embodiments described herein.

FIG. 5A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system, a scanning system, a scanning apparatus, a digital scanning apparatus, a digital slide scanning apparatus, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more additional cameras 620 (e.g., a line scan camera or an area scan camera), each of which define a separate field of view 625 on the sample 590 and/or glass slide 585. The various elements of the scanner system 550 are communicatively coupled via one or more communication busses 560. Although there may be one or more of each of the various elements of the scanner system 550, for the sake of simplicity, these elements will be described herein in the singular except when needed to be described in the plural to convey the appropriate information.

The one or more processors 555 may include, for example, a central processing unit (CPU) and a separate graphics processing unit (GPU) capable of processing instructions in parallel, or the one or more processors 555 may include a multicore processor capable of processing instructions in parallel. Additional separate processors may also be provided to control particular components or perform particular functions, such as image processing. For example, additional processors may include an auxiliary processor to manage data input, an auxiliary processor to perform floating point mathematical operations, a special-purpose processor having an architecture suitable for fast execution of signal-processing algorithms (e.g., digital-signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

In an embodiment, the processor 555 is configured to control movement of the scanning stage 580 (e.g., corresponding to scanning stage 100) and to control activation of the sensor pair 310. The processor is also configured to receive and analyze the signal from the sensor pair 310 to determine the presence or absence of a slide 585 (e.g., corresponding to slide 150) or the stage 580, as appropriate for the circumstances. In an embodiment, the processor is configured to control the stage 580 to stop movement if an improper position of a slide 585 is determined.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, a removable storage drive, and/or the like. The processor 555 is configured to execute instructions that are stored in the memory 565 and communicate via communication bus 560 with the various elements of the scanner system 550 to carry out the overall function of the scanner system 550.

The one or more communication busses 560 may include a communication bus 560 that is configured to convey analog electrical signals, and may include a communication bus 560 that is configured to convey digital data. Accordingly, communications from the processor 555, the motion controller 570, and/or the interface system 575, via the one or more communication busses 560, may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X, Y, and/or Z movement of the stage 580 (e.g., within an X-Y plane) and/or the objective lens 600 (e.g., along a Z axis orthogonal to the X-Y plane, via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source may comprise a variable intensity halogen light source with a concave reflective mirror to maximize light output and a KG-1 filter to suppress heat. The light source could also comprise any type of arc-lamp, laser, or other source of light. In an embodiment, the illumination system 595 illuminates the sample 590 in transmission mode such that the line scan camera 615 and/or camera 620 sense optical energy that is transmitted through the sample 590. Alternatively, or in combination, the illumination system 595 may also be configured to illuminate the sample 590 in reflection mode such that the line scan camera 615 and/or camera 620 sense optical energy that is reflected from the sample 590. The illumination system 595 may be configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon-sensitive molecules that can absorb light at a specific wavelength (excitation). These photon-sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10-bit 64-linear-array TDI line scan camera. It should be noted that a variety of bit depths for the line scan camera 615 can be employed for use with a fluorescence scanner embodiment of the scanning system 550.

The movable stage 580 is configured for precise X-Y movement under control of the processor 555 or the motion controller 570. The movable stage may also be configured for Z movement under control of the processor 555 or the motion controller 570. The movable stage is configured to position the sample in a desired location during image data capture by the line scan camera 615 and/or the area scan camera. The movable stage is also configured to accelerate the sample 590 in a scanning direction to a substantially constant velocity, and then maintain the substantially constant velocity during image data capture by the line scan camera 615. In an embodiment, the scanner system 550 may employ a high-precision and tightly coordinated X-Y grid to aid in the location of the sample 590 on the movable stage 580. In an embodiment, the movable stage 580 is a linear-motor-based X-Y stage with high-precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate (e.g., a 96-well plate). Other examples of the sample 590 include integrated circuit boards, electrophoresis records, petri dishes, film, semiconductor materials, forensic materials, or machined parts.

Objective lens 600 is mounted on the objective positioner 630, which, in an embodiment, employs a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in X, Y, and/or Z axes are coordinated and controlled in a closed-loop manner using motion controller 570 under the control of the processor 555 that employs memory 565 for storing information and instructions, including the computer-executable programmed steps for overall scanning system 550 operation.

In an embodiment, the objective lens 600 is a plan apochromatic ("APO") infinity corrected objective with a numerical aperture corresponding to the highest spatial resolution desirable, where the objective lens 600 is suitable for transmission-mode illumination microscopy, reflection-mode illumination microscopy, and/or epi-illumination-mode fluorescence microscopy (e.g., an Olympus 40X, 0.75 NA or 20X, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens 600 becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600, combined with the focusing optics 610, provides the total magnification for the scanning system 550. In an embodiment, the focusing optics 610 may contain a tube lens and an optional 2x magnification changer. Advantageously, the 2x magnification changer allows a native 20x objective lens 600 to scan the sample 590 at 40x magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615, so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the other line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored in a portion of the memory 565 and processed by the one or more processors 555 to generate focus information, to allow the scanner system 550 to adjust the relative distance between the sample 590 and the objective lens 600 to maintain focus on the sample during scanning. Additionally, in an embodiment, the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image stripe. A plurality of adjacent image stripes are similarly combined together to form a contiguous digital image of a portion or the entire sample 590. The scanning of the sample 590 may include acquiring vertical image stripes or horizontal image stripes. The scanning of the sample 590 may be either top-to-bottom, bottom-to-top, or both (bi-directional), and may start at any point on the sample. Alternatively, the scanning of the sample 590 may be either left-to-right, right-to-left, or both (bi-directional), and may start at any point on the sample. Additionally, it is not necessary that image stripes be acquired in an adjacent or contiguous manner. Furthermore, the resulting image of the sample 590 may be an image of the entire sample 590 or only a portion of the sample 590.

In an embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer-executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 5B:
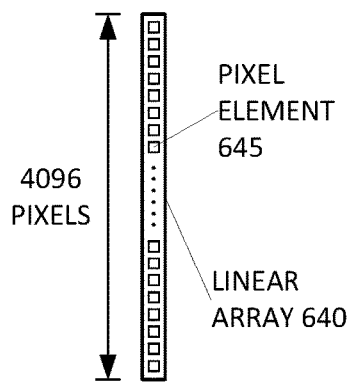
FIG. 5B is a block diagram illustrating an example line scan camera having a single linear array, according to an embodiment.

FIG. 5B illustrates a line scan camera having a single linear array 640, which may be implemented as a charge coupled device (CCD) array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view 625 varies in accordance with the magnification of the scanner system 550.

Figure 5C:
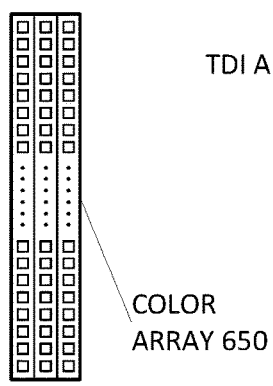
FIG. 5C is a block diagram illustrating an example line scan camera having three linear arrays, according to an embodiment.

FIG. 5C illustrates a line scan camera having three linear arrays, each of which may be implemented as a CCD array. The three linear arrays combine to form a color array 650. In an embodiment, each individual linear array in the color array 650 detects a different color intensity, for example, red, green, or blue. The color image data from each individual linear array in the color array 650 is combined to form a single field of view 625 of color image data.

Figure 5D:
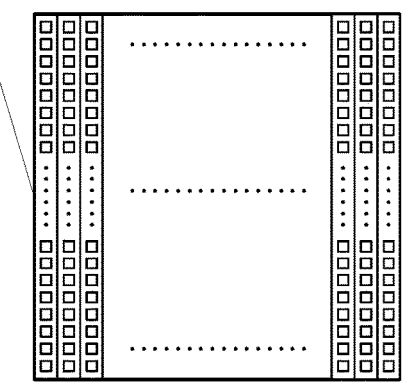
FIG. 5D is a block diagram illustrating an example line scan camera having a plurality of linear arrays, according to an embodiment.

FIG. 5D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example, common formats of TDI line scan cameras include 24, 32, 48, 64, 96, 120, and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital slide scanning apparatus comprising:
a scanning stage configured to receive a slide and secure the slide to the scanning stage;
a motor configured to move the scanning stage during a scanning process;
a sensor pair comprising a transmitter element and a receiver element, wherein the transmitter and receiver elements are positioned to detect the presence or absence of a slide at one or more positions during the scanning process, wherein both of the transmitter element and the receiver element of the sensor pair are positioned above the scanning stage on a same side of the scanning stage, wherein the transmitter element is configured to transmit a signal, and wherein the receiver element is configured to receive the signal, transmitted by the transmitter element, when the signal is reflected by a surface at the one or more positions; and
at least one processor configured to, during the scanning process for a slide,
control the motor to move the scanning stage,
receive a signal from the sensor pair,
analyze the signal to determine a presence or absence of the slide,
determine that the slide is improperly positioned based on the determination of the presence or absence of the slide, and,
when the slide is determined to be improperly positioned, control the motor to stop movement of the scanning stage.

2. The digital slide scanning apparatus of claim 1, wherein the at least one processor is configured to determine that the slide is improperly positioned based on the presence of the slide at a position external to the scanning stage.

3. The digital slide scanning apparatus of claim 1, wherein the at least one processor is configured to determine that the slide is improperly positioned based on the absence of the slide at a position on the scanning stage.

4. The digital slide scanning apparatus of claim 1, wherein the at least one processor is configured to determine that the slide is present when the receiver element receives the signal, transmitted by the transmitter element.

5. The digital slide scanning apparatus of claim 1, wherein the at least one processor is configured to determine that the slide is absent when the receiver element does not receive the signal, transmitted by the transmitter element.

6. The digital slide scanning apparatus of claim 1, wherein the scanning stage comprises a through hole, over which a glass slide is supported by the scanning stage and through which a glass slide can be illuminated while on the scanning stage during the scanning process, and wherein the transmitter element is positioned such that, when a glass slide is improperly positioned during movement of the scanning stage, the signal transmitted by the transmitter element passes through the through hole without reflecting to the receiver element.

7. The digital slide scanning apparatus of claim 1, wherein the at least one processor is configured to, prior to loading a first slide onto the scanning stage:
receive a signal from the sensor pair,
analyze the signal to determine a presence of a second slide on the scanning stage, and
prevent loading of the first slide onto the scanning stage as long as the second slide is determined to be present on the scanning stage.

8. The digital slide scanning apparatus of claim 7, further comprising:
a slide rack comprising a plurality of slots configured to hold slides; and
an assembly configured to load a slide from each of the plurality of slots in the slide rack onto the scanning stage, and unload a slide from the scanning stage into each of the plurality of slots in the slide rack,
wherein the at least one processor is configured to,
control the assembly to unload the second slide into a slot in the slide rack prior to loading the first slide, and
control the assembly to load the first slide from a slot in the slide rack onto the scanning stage after unloading the second slide.

9. The digital slide scanning apparatus of claim 1, wherein the at least one processor is configured to, prior to commencing the scanning process:
receive a signal from the sensor pair,
analyze the signal to determine a presence or absence of a slide on the scanning stage, and
prevent commencement of the scanning process until after determining that a slide is present on the scanning stage.

10. The digital slide scanning apparatus of claim 1, further comprising:
a slide rack comprising a plurality of slots configured to hold slides; and
an assembly configured to load a slide from each of the plurality of slots in the slide rack onto the scanning stage, and unload a slide from the scanning stage into each of the plurality of slots in the slide rack,
wherein the at least one processor is configured to control the assembly to load a slide from each of the plurality of slots in the slide rack onto the scanning stage, and unload a slide from the scanning stage into each of the plurality of slots in the slide rack.

11. The digital slide scanning apparatus of claim 10, wherein the at least one processor is configured to, when the slide is determined to be improperly positioned, control the assembly to:
at least partially unload the slide into a slot in the slide rack; and
reload the slide from the slot in the slide rack onto the scanning stage.

12. The digital slide scanning apparatus of claim 1, wherein the at least one processor is configured to, when the slide is determined to be improperly positioned, control the motor to reposition the scanning stage.

13. A digital slide scanning apparatus comprising:
a scanning stage configured to receive a slide and secure the slide to the scanning stage;
a motor configured to move the scanning stage during a scanning process;
a sensor pair comprising a transmitter element and a receiver element, wherein the transmitter and receiver elements are positioned to detect the presence or absence of a slide at one or more positions during the scanning process; and
at least one processor configured to, during the scanning process for a slide,
control the motor to move the scanning stage,
receive a signal from the sensor pair,
analyze the signal to determine a presence of the slide at a position external to the scanning stage,
determine that the slide is improperly positioned based on the determination of the presence of the slide at the position external to the scanning stage, wherein the position external to the scanning stage is within a boundary of the slide while the slide is positioned on the scanning stage prior to commencement of the scanning process, but is outside the boundary of the slide if the slide is properly positioned on the scanning stage during at least a beginning portion of the scanning process, and,
when the slide is determined to be improperly positioned, control the motor to stop movement of the scanning stage.

14. The digital slide scanning apparatus of claim 13, wherein both of the transmitter element and the receiver element of the sensor pair are positioned on a same side of the scanning stage.

15. The digital slide scanning apparatus of claim 14,
wherein the transmitter element and the receiver element of the sensor pair are positioned above the scanning stage,
wherein the transmitter element is configured to transmit a signal, and
wherein the receiver element is configured to receive the signal, transmitted by the transmitter element, when the signal is reflected by a surface at the one or more positions.

16. The digital slide scanning apparatus of claim 13, wherein the transmitter element of the sensor pair is positioned on a different side of the scanning stage than the receiver element of the sensor pair.

17. A digital slide scanning apparatus comprising:
a scanning stage configured to receive a slide and secure the slide to the scanning stage;
a motor configured to move the scanning stage during a scanning process;
a sensor pair comprising a transmitter element and a receiver element, wherein the transmitter and receiver elements are positioned to detect the presence or absence of a slide at one or more positions during the scanning process, wherein the transmitter element of the sensor pair is positioned on a different side of the scanning stage than the receiver element of the sensor pair, wherein one of the transmitter element and the receiver element is positioned above the scanning stage, wherein the other one of the transmitter element and the receiver element is positioned below the scanning stage, wherein the transmitter element is configured to transmit a signal, and wherein the receiver element is positioned in a line of sight of the transmitter element and is configured to receive the signal, transmitted by the transmitter element, when the signal passes through the one or more positions; and at least one processor configured to, during the scanning process for a slide,
- control the motor to move the scanning stage,
- receive a signal from the sensor pair,
- analyze the signal to determine a presence or absence of the slide,
- determine that the slide is improperly positioned based on the determination of the presence or absence of the slide, and,
- when the slide is determined to be improperly positioned, control the motor to stop movement of the scanning stage.

18. The digital slide scanning apparatus of claim 17, wherein the at least one processor is configured to determine that the slide is present when the receiver element does not receive the signal, transmitted by the transmitter element.

19. The digital slide scanning apparatus of claim 17, wherein the at least one processor is configured to determine that the slide is absent when the receiver element receives the signal, transmitted by the transmitter element.

20. A method in a digital slide scanning apparatus that comprises
- a scanning stage configured to receive a slide and secure the slide to the scanning stage,
- a motor configured to move the scanning stage during a scanning process,
- a sensor pair comprising a transmitter element and a receiver element, wherein the transmitter and receiver elements are positioned to detect the presence or absence of a slide at one or more positions during the scanning process, wherein the transmitter element of the sensor pair is positioned on a different side of the scanning stage than the receiver element of the sensor pair, wherein one of the transmitter element and the receiver element is positioned above the scanning stage, wherein the other one of the transmitter element and the receiver element is positioned below the scanning stage, wherein the transmitter element is configured to transmit a signal, and wherein the receiver element is positioned in a line of sight of the transmitter element and is configured to receive the signal, transmitted by the transmitter element, when the signal passes through the one or more positions, and
- at least one processor, the method comprising, by the at least one processor, during the scanning process for a slide:
- controlling the motor to move the scanning stage;
- receiving a signal from the sensor pair;
- analyzing the signal to determine a presence or absence of the slide;
- determining that the slide is improperly positioned based on the determination of the presence or absence of the slide; and,
- when the slide is determined to be improperly positioned, controlling the motor to stop movement of the scanning stage.

* * * * *